June 7, 1927.  V. G. APPLE  1,631,186
METHOD OF BUILDING DYNAMO ELECTRIC MACHINE ARMATURES AND WINDINGS FOR SAME
Filed Sept. 22, 1924  3 Sheets-Sheet 1
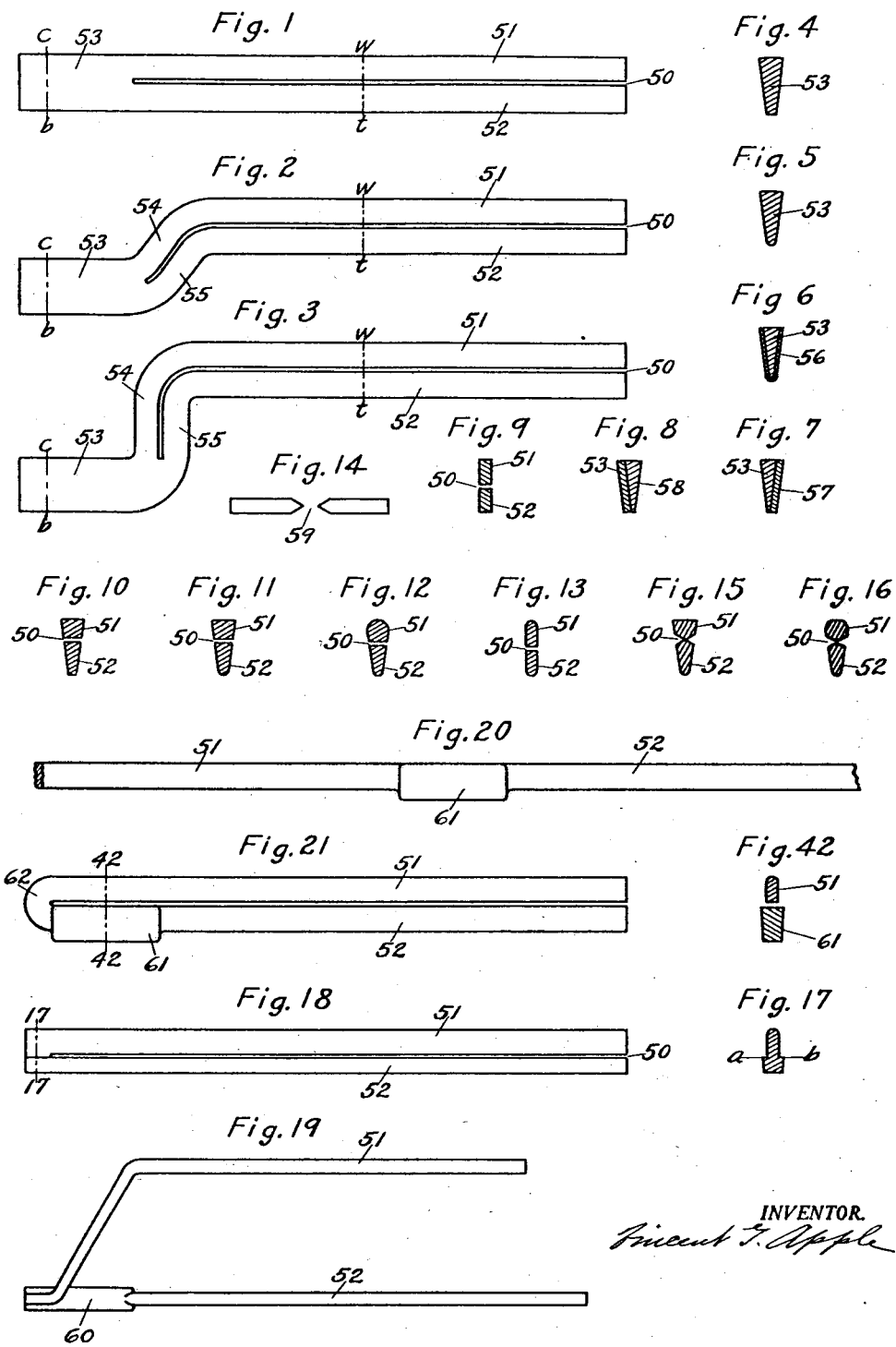
INVENTOR.
Vincent G. Apple June 7, 1927.

V. G. APPLE 1,631,186

METHOD OF BUILDING DYNAMO ELECTRIC MACHINE ARMATURES AND WINDINGS FOR SAME

Filed Sept. 22, 1924    3 Sheets-Sheet 2

INVENTOR.
Vincent G. Apple

June 7, 1927.
V. G. APPLE
1,631,186
METHOD OF BUILDING DYNAMO ELECTRIC MACHINE ARMATURES AND WINDINGS FOR SAME
Filed Sept. 22, 1924    3 Sheets-Sheet 3
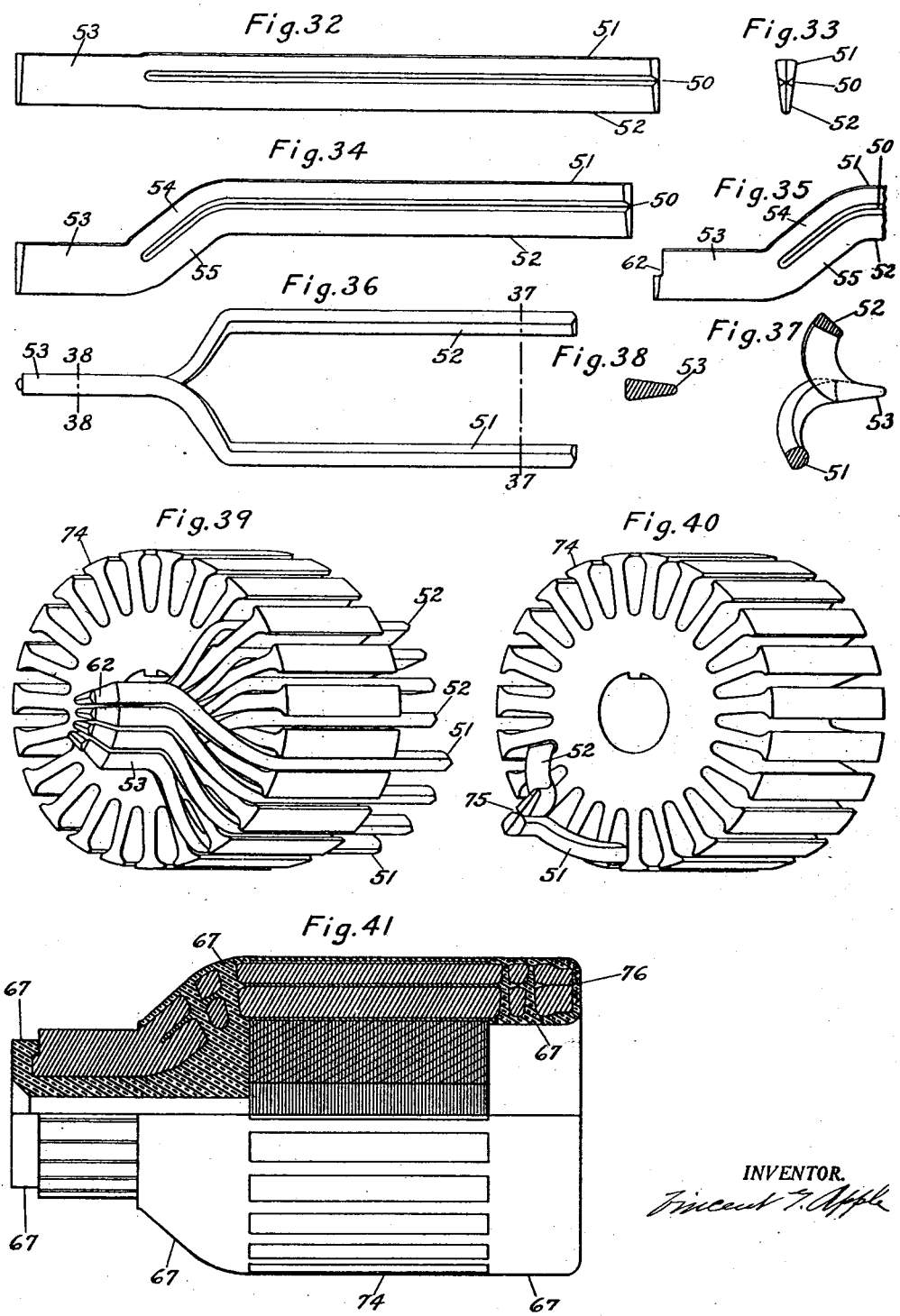

Patented June 7, 1927.

1,631,186

UNITED STATES PATENT OFFICE.

VINCENT G. APPLE, OF DAYTON, OHIO.

METHOD OF BUILDING DYNAMO-ELECTRIC MACHINE ARMATURES AND WINDINGS FOR SAME.

Application filed September 22, 1924. Serial No. 738,993.

This invention relates particularly to methods of building armatures of the type comprising a core, a commutator and a bar winding and while in ordinary practice a commutator bar must be joined to each turn of such a winding it is an object of this invention to provide a structure a single unit whereof comprises a commutator bar and a turn of the winding integral, to the end that the cost may be reduced by decreasing the number of parts, the electrical circuit improved by eliminating some of the joints, and a finished article provided which will be more durable and dependable and of better appearance than when made by present methods.

Other objects will be apparent to those skilled in the art as the invention is described in detail and reference is made to the drawings wherein—

Figs. 1, 2 and 3 show several partially completed forms of my commutator bar and winding turn.

Figs. 4 and 5 are cross sections taken through the commutator bars, and either cross section shown may represent a section taken on a line c—b of Figs. 1, 2 or 3.

Figs. 6, 7 and 8 show methods of increasing the thickness of a commutator lug to compose a commutator segment.

Figure 22:
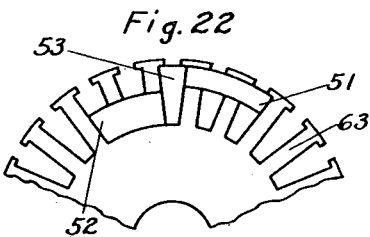

Figs. 9 to 13 inclusive are cross sections taken through the winding legs, and any one of the cross sections shown may represent a section taken on a line w—t of Figs. 1, 2 or 3.

Fig. 14 shows one form of cutter which I may employ to separate the bars to form the two legs of a winding turn.

Fig. 15 shows how a bar of a cross section, as in Fig. 5, appears when cut apart by a cutter such as is shown in Fig. 14.

Fig. 16 shows how the sharp corners of the bar shown in Fig. 15 may be rounded by striking in a die.

Fig. 17 is a cross section through a bar particularly suitable where limitations in armature length are imposed.

Figs. 18 and 19 show how a bar of a cross section shown in Fig. 17, is split and bent to compose a commutator bar and winding turn.

Figs. 20 and 21 show how a bar of uniform cross section throughout its entire length may be upset to provide a commutator bar and winding turn suitable where limitations in armature length are imposed.

Figs. 22 to 25 inclusive show some of my winding units inserted in the slots of an armature core.

Figs. 26 to 31 inclusive show means which I employ to bind the segments together to form a commutator therefrom.

Fig. 32 shows a bar which has been both cut to length and split by a cutter such as I show in Fig. 14.

Fig. 33 is an end view of the bar Fig. 32.

Fig. 34 shows how the bar Fig. 33 is bent to provide a commutator smaller than the armature core.

Fig. 35 shows how the bars are notched to form projections upon which a binding means may bear to bind the segments together to compose a commutator.

Fig. 36 shows the bar after the conductor legs are spread apart sufficiently to compose a winding turn.

Figs. 37 and 38 are cross sections taken on lines 37—37 and 38—38 of Fig. 36.

Fig. 39 shows a number of units Fig. 36 assembled on a core.

Fig. 40 shows one pair of the open ends brought together and joined to complete the circuit.

Fig. 41 shows a completed armature, partly in section.

Fig. 42 is a cross section taken at 42—42, Fig. 21.

Similar numerals refer to similar parts throughout the several views.

Armatures of the class to which my improvement applies vary considerably in several of their proportions, as for instance an armature of a given diameter may have in one case a commutator of the same diameter as the core, and in another case a commutator of half the diameter of the core. The apertures or slots in an armature core into which the conductors are laid vary considerably in contour, and to use conductors of maximum capacity in a given slot the contour of the conductor must closely conform to the contour of the slot. The proportion of the core slots relative to the intervening space commonly called the core teeth varies considerably, the circumferential extent of a slot ranging from half to double that of a tooth. In order that my invention may be more universally employed it is therefore necessary that considerable variation may be had in both the cross section and outline of my winding turns.

When applying my winding to an armature having a commutator of substantially equal diameter to the armature core I start with a blank as shown in Fig. 1, where a bar has been sawed or otherwise split, as at 50, providing a leg 51 which later becomes a conductor of the outer layer of the winding, a leg 52 which later becomes a conductor of the inner layer of the winding and a portion or lug 53 which later becomes a segment of the commutator. When the commutator is to be considerably smaller relative to the core the blank may be as in Fig. 2 and when very much smaller it may be as in Fig. 3, the bent portions 54 and 55 of the conductor bars being brought to the form shown by bending a blank like the one shown in Fig. 1, or the blanks Figs. 2 and 3 may be so cut from a sheet or be otherwise fabricated to provide forms as shown.

A cross section taken through a commutator bar on lines c—b, Figs. 1, 2 and 3, is preferably as in Figs. 4 or 5. Since the spacers of mica or other insulating material usually employed between bars of a commutator are usually taken from flat sheet stock it follows that a wedge shaped cross section as shown is most suitable for a commutator bar. When the commutator is to be of a diameter substantially that of the armature core it is obvious that the commutator bars must be considerably thicker than the conductor legs since the insulating spacers between the commutator bars are thinner than the core teeth which separate the conductor legs in the finished armature. Such a condition may be met in several ways. For instance, I may use a drawn bar of such cross section as to be suitable without change for the desired commutator segment and, after splitting as in Fig. 1, form conductor legs of thinner cross section by striking in a die or otherwise fabricating the split portions to the desired thinness and contour, or I may use a drawn bar of such size and cross section as to be suitable, after splitting, to form the conductor legs without further change and then increase the thickness of the commutator lug either by striking it edgewise in a die, by upsetting, or by adding a U-shaped strip of metal, as at 56, Fig. 6, or by adding a pad to the side of each commutator lug 53, as at 57, Fig. 7, or at 58, Fig. 8. When a pad is so added to the side of each commutator lug it may be joined thereto by soldering, brazing or welding, or it may be notched in a manner similar to its corresponding commutator lug so that the means employed to bear on the notched portions of the commutator lugs to bind the commutator together will also hold the pads in proper position in the completed commutator. The manner of notching the commutator lugs to provide projections whereon the binding means may bear is shown in Figs. 26 to 31 inclusive and will be later described.

For commutators of relatively large diameter as compared to the diameter of the armature core this method of padding out the commutator lugs to compose commutator segments offers many advantages, as, for instance, when the slots in a core require that the cross section of a pair of conductor legs be as in Fig. 9, a punching of suitable thickness and of the form shown in Fig. 1 may be taken from flat sheet stock and a pad comprising one or even more layers may be added to the side of lug 53, as at 58, Fig. 8, the padding being of such cross section as to make the composite cross section of lug and pad similar to the cross section Fig. 4 and of a size suitable for the desired commutator segment. Conversely, when the core slots are of such shape as to require a pair of conductor legs of wedge shaped cross section but which are not thick enough for the desired commutator segment a pad taken from sheet stock may be added to the side of lug 53, as at 57, Fig. 7, to compose a composite cross section similar to Fig. 4 and suitable in size and contour for the desired commutator segment. This system of padding may be thus varied to accommodate core slots of any shape desired.

Often, however, it is desirable that the commutator of an armature be considerably smaller than the armature core and in such cases it is usually possible to so proportion the core slots that a drawn bar of wedge shaped cross section, as in Figs. 4 or 5, bent and split as in Fig. 2, will, with little or no change in cross section at any point, be adapted to compose a commutator segment and two conductor legs integral, as shown. Bar stock of this form is readily obtainable as it is commercially produced in varying wedge angles for use in making commutators of the conventional type. In many cases therefore a suitable proportion of commutator diameter to core diameter will be had when stock of the cross section of Figs. 4 or 5 is cut apart to form conductor legs, as at 51 and 52, Fig. 10, or at 51 and 52, Fig. 11, and the core slots proportioned to receive each a pair of such legs with no change in cross section therein, the bar either before or after splitting being bent as at 54 and 55, Fig. 2.

A form of core slot much used is one of wedge shape but rounded both at its outer and inner ends and for such a slot the conductor legs would preferably be shaped as at 51 and 52, Fig. 12. It is then optional whether I split a drawn bar, such as is shown in Fig. 5, and round the top edge of the outer conductor leg 51 as in Fig. 12 to conform to such slot or a drawn bar formed as in Fig. 12 and flatten the thicker rounded outer edge where required to provide a commutator segment as in Fig. 5. When the core slots are best adapted to receive conductor legs as at 51 and 52, Figs. 9 and 13 and a commutator considerably smaller than the core is desired I may cut a blank as in Fig. 3 from flat sheet stock and strike the lug 53 flatwise to bring it to the wedge shape necessary for a commutator segment.

For cutting off and splitting bar stock to form my winding units I may employ as a preferred method a pair of cutter blades as shown in Fig. 14 where the cutting edges 59 come together to separate a bar of the form shown in Fig. 5 into parts 51 and 52, as shown in Fig. 15. By using this form of cutter no burrs are produced at the outer edges of the conductors where they may interfere with entry into the core slots. A bar so cut may, when spreading the conductors apart to loop form, be struck in a die to slightly round all sharp edges of the conductors 51 and 52 to bring them to the form shown at 51 and 52, Fig. 16.

To provide an armature having a commutator extending at minimum distance outwardly from the core I may use a drawn bar having a cross section as in Fig. 17 and, to provide two conductor legs, cut it apart on the line a—b. When first so cut apart the bar will appear as in Fig. 18, the inner leg 52 being thicker than the outer leg 51, a cross section through the unsplit end at 17—17 remaining as in Fig. 17. Next the conductor legs are spread apart as in Fig. 19 and after allowing a sufficient length of the thicker inner leg 52 for a commutator segment, as at 60, the remainder is struck in a die or otherwise reformed to conform to the inner half of the core slot. In the instant case the outer leg 51 has a cross section as at 51, Fig. 13, and the inner leg 52 after reforming has a cross section as at 52, Fig. 13.

To accomplish a similar result I may use a length of bar stock of a cross section as at 52, Fig. 13, and upset a portion near the middle to provide a commutator segment as at 61, Fig. 20, after which I may bend the length as at 62, Fig. 21, and then spread apart the legs in a manner similar to Fig. 19. A cross section through commutator segment 61 and outer leg 51 taken at 42—42 is shown in Fig. 42.

As another means of providing a commutator immediately adjacent the core I may use a length of bar stock of a cross section as at 52, Fig. 13, and bend it first as at 62, Fig. 21, then spread apart the legs in a manner similar to Fig. 19 and provide a thickened portion as at 61, Fig. 20, by adding a pad at this point, the pad being of such size and cross section as added to the bar will provide the necessary segment.

It is obvious that a winding unit so formed will provide a commutator immediately adjacent to the core whereas ordinarily the commutator occupies a position considerably removed from the core and while I here show a unit adapted to form an internal commutator it is apparent that with slight modification of the cross section shown in Fig. 17 an external commutator may be provided.

In Figs. 22, 23, 24 and 25 I show how the winding units shown in Figs. 1, 2, 3 and 18 respectively appear after the legs are spread apart and inserted in the slots of a core, the outer conductor legs occupying a position in the outer half of a core slot and the inner legs a position in the inner half of a core slot. The commutator lug 53 occupies in Fig. 22 a position adapted to provide a commutator substantially as large as the core, in Fig. 23 a commutator considerably smaller than the core, and in Fig. 24 a commutator very much smaller than the core. The commutator lug 60, Fig. 25, occupies a position adapted to provide a segment of an internal commutator. To bring lug 53, Fig. 22, to a thickness sufficient for a commutator segment a pad is preferably added thereto as shown in and described relative to Fig. 7, the pad being of a thickness substantially that of a core tooth 63. To bring lug 53, Fig. 24, to suitable cross section for a commutator segment it may be struck flatwise in a die to bring it to the wedge shaped section shown.

Figure 23:
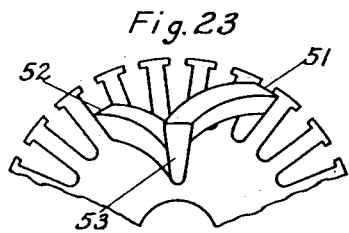
Figure 24:
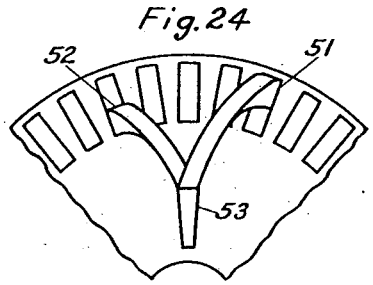

While I have herein shown and described several forms which my winding units may take and several methods which I may pursue to provide same in accordance with my invention, considerable variation in both the article and method may be allowed within the scope of the invention, as for instance whereas in Figs. 22, 23 and 24 I show how the conductors of a loop are spread apart to compose a winding turn each conductor being circumferentially displaced equally from the commutator segment, they may if desired be displaced the one more than the other, the object being merely to spread the legs sufficiently to compose a turn of the winding which is usually about one pole pitch and while I describe methods of variously producing the winding units from bar stock or from flat sheets it is to be understood that I consider any winding unit of the character shown to come within the scope of my invention whether it is so made or whether it is forged, sand or die cast or otherwise fabricated to bring it to the forms shown or to similar forms within the spirit of the invention.

Figure 26:
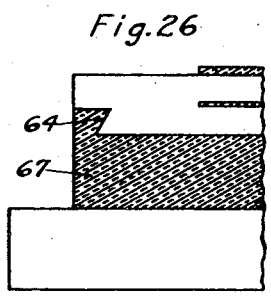
Figure 27:
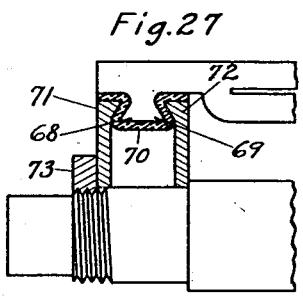
Figure 28:
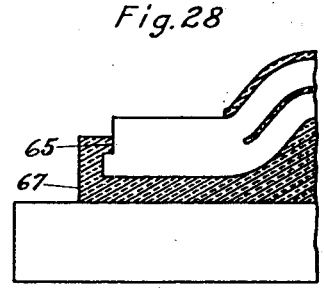
Figure 31:
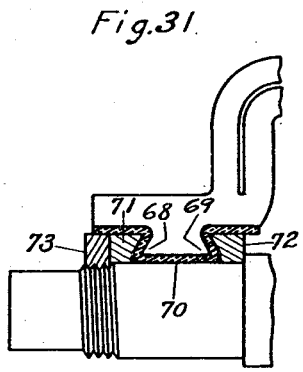
Figure 30:
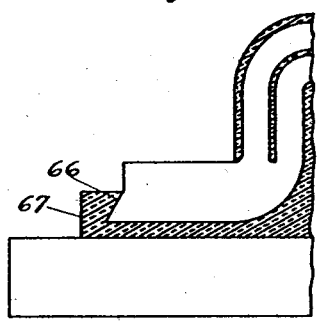
Figure 29:
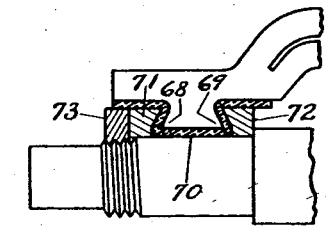

When a plurality of my winding units are assembled to compose an integral commutator and winding, a means of binding the several commutator segments together must be provided, and in Figs. 26 to 31 inclusive I show several methods by which I accomplish this end. In Figs. 26, 28 and 30 the commutator lugs are first cut as at 64, 65 or 66 then after assembly the structure is placed in a mould and fluid insulating material 67 is poured or pumped into the mould to surround the lugs as shown and then hardened or allowed to harden by heat or otherwise to form a solid mass which binds the lugs together to form a commutator. In Figs. 27, 29 and 31 the lugs are cut somewhat differently and the segments bound together in a manner similar to that used in common practice in commutator building where notches are so cut as to leave points on the lugs as at 68 and 69 oppositely extending, insulation as at 70 covers the notched portions of the bars and conical washers as at 71 and 72 are drawn toward each other at opposite ends of the notched portions by a nut 73 to bind the commutator segments together.

Figure 25:
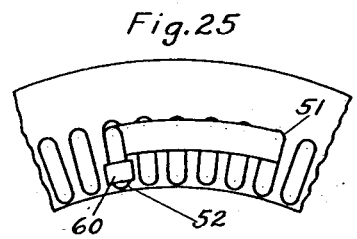

Bars of the type shown in Fig. 19 after being assembled in a core as in Fig. 25 are preferably bound together by the moulding method described especially where an internal commutator is desired as then there is ample space around the bars for a heavy ring of insulating material.

In Figs. 32 to 41 inclusive I more clearly show by several steps one method I employ to complete an armature. Bar stock of a cross section as shown in Fig. 5 is cut into suitable lengths and split by cutting blades as shown in Fig. 14 to provide bars 51 and 52 as shown in Fig. 32 and in its end view Fig. 33. The bars are then bent as at 54 and 55 to the form shown in Fig. 34. Next they are notched as at 62, Fig. 35 to provide projections upon which moulded insulation used as a binding means may afterward bear to bind the segments together into a commutator, though, if desired, the bars may be notched as in Fig. 29 leaving points 68 and 69 oppositely extending and the commutator may be bound together by the conical washers 71 and 72 and the nut 73 as therein shown. Next the legs are spread apart to form open end loops as in Fig. 36 and at the same time the conductor legs 51 and 52 are struck in the die so that they will have a cross sectional contour as at 51 and 52, Fig. 37, leaving a commutator segment having a cross sectional contour as at 53, Fig. 38. A number of such loops corresponding to the number of slots in the core 74 are then stacked in cylindrical formation with the free ends of the conductors slightly entered into the core slots then simultaneously endwise entered in the core. For clearness of illustration in Fig. 39 I show only a portion of the winding units assembled with the core but it is obvious that the entire required number may be thus entered at one and the same time. As the method of assembling a complete set of conductors and pressing them simultaneously into the slots of a core, bending the free ends simultaneously to form pairs and joining the pairs by welding or otherwise to complete the circuit has been made the subject of prior claims no extensive description of this portion of the method is herein contained.

Some of the methods used in common practice may be employed such as placing spacers of insulating material between the commutator segments, and insulating linings in the core slots. While I herein show a core having partially closed slots into which the conductors must be endwise entered it is apparent that such conductors may be similarly entered into slots which are entirely open or entirely closed or they may be radially entered one at a time in a core having open slots.

Fig. 40 shows only one pair of the free ends of the conductor bars 51 and 52 and how they are brought together and joined as at 75 to complete the circuit, the manner in which they are bent and joined being typical of the entire winding. The joints may be maintained by welding, brazing, soldering or otherwise, welding being a preferred method, the two ends being shown after welding at 76, Fig. 41, but while I have herein shown and described this method of joining the free ends of the winding by bending the ends to form pairs as in Fig. 40, it is obvious that the older method of using separate end connectors of involute or other form may be employed if so desired.

In Fig. 41 I show a complete armature partly in section wherein I employ welding as at 76 to complete the winding turns and moulded insulation 67 to bind the commutator together in the manner described relative to Figs. 26, 28 and 30, the moulded insulation being here further employed to surround the entire winding as shown. It is however equally practicable, when the commutator bars are appropriately notched, to bind this commutator together by the other method shown in and described relative to Figs. 27, 29 and 31.

While in Figs. 32 to 41 inclusive I have outlined steps whereby one form of my invention may be put into practice, it is obvious that the steps described need not necessarily be carried out in the order given since with proper tools and equipment several steps may be combined into a single operation and while I herein indicate that the winding is to be assembled with the core prior to binding the segments together to form a commutator, it is obvious and it may be preferred that these winding loops be stacked in cylindrical formation and the binding means applied to the commutator to thus compose a complete commutator with winding integrally attached which may be afterward endwise entered into the core slots and properly joined at the free ends to complete the circuit. I am aware that prior to this invention armatures have been built having as their winding, loops, each comprising one turn, assembled in a core, their free ends bent and joined in pairs and attached to separate commutator segments, or paired one with another to form commutator segments. An important difference therefore, between this and prior methods, consists in having a complete commutator segment integral with and at the closed end of the loop.

Having described my invention, I claim:

1. As an article of manufacture, a commutator segment having two armature conductors integrally extending therefrom.

2. As a turn of an armature winding, an integral unit comprising two conductors joined in the form of a loop open at one end and closed at the other, the closed end being extended to compose a commutator segment.

3. As an article of manufacture, an integral unit of an armature winding comprising a commutator segment and two armature conductors, all of wedge shaped cross section, the conductors being spaced apart to compose one turn of the winding.

4. As a unit of an armature winding, a commutator segment having two armature conductors integrally extending therefrom, one conductor bar being of suitable cross section and form to occupy the outer half of a core slot to compose a half turn of the outer layer of an armature winding, another conductor bar being of suitable cross section and form and positioned relative to the first conductor to occupy the inner half of a core slot to compose a half turn of the inner layer of the armature winding, and said segment being so positioned relative to the conductor bars as to form one segment of the commutator.

5. The method of making a unit of an armature winding, which consists of cutting off a length of commutator bar stock and longitudinally splitting the same from one end to a point somewhat removed from the other, with U-shaped cutters which, cutting inward from both sides, leave no burrs at the outer edges, bending the bar so that one of the split portions may occupy a position in the outer layer of the winding, the other split portion may occupy a position in the inner layer of the winding and the unsplit portion may be in a suitable position to compose a segment of the commutator, notching the unsplit portion to provide means whereon a commutator binding means may bear and spreading apart the split portions sufficiently to compose a winding turn.

6. As a turn of an armature winding, a single piece of conductive material in the form of a loop, open at one end and closed at the other, the legs of the loop being of suitable form to compose two conductor bars of the winding, and the closed end being so formed as to provide thereon a suitable commutating surface.

7. As a turn of an armature winding, a bar of wedge shaped cross section, longitudinally split from one end to a point somewhat removed from the other, the split portion being spread apart to compose the two conducting bars of the winding turn, and the unsplit portion being of sufficient length and suitably positioned relative to the conducting bars to provide a commutator segment.

8. In a dynamo electric machine armature, a core having a plurality of winding apertures, a plurality of winding turns each composed of a single piece of conductive material comprising two conductor bars of the winding joined at one end and suitably formed at said joined end to compose a commutator segment, insulating spacers separating said segments, and a binding means to bind said segments together to form a commutator, said segments being provided with projections whereon said binding means may bear.

9. In a dynamo electric machine armature, a slotted core, a plurality of winding units each composed of a wedge shaped bar, longitudinally split from one end to a point somewhat removed from the other, the split portion being spread apart sufficiently to compose the two conducting bars of a winding turn, and the unsplit portion being suitably positioned relative to the conducting bars to compose a commutator segment, insulating material binding said segments together to form a commutator, said segments being provided with projections whereon the insulating material may bear.

10. The method of making a dynamo electric machine armature, which consists of providing a slotted core and a plurality of wedge shaped bars of conductive material, longitudinally splitting each bar from one end to a point somewhat removed from the other, spreading apart the split portion of each bar to compose the two conducting bars of a winding turn, and suitably positioning the unsplit portion of each bar relative to said conducting bars to compose a commutator segment, notching said segments, assembling the winding units thus provided with the core, joining the open ends to complete the circuit, and molding insulating material thru and about the structure to bind the segments together.

11. The method of making a commutator and winding for a dynamo electric machine armature, which consists of providing a plurality of bars, longitudinally splitting each bar from one end to a point somewhat removed from the other, spreading the split portion sufficiently to compose the two conducting bars of a winding turn, suitably positioning the unsplit portion, relative to said conducting bars, to compose a commutator segment, notching said segment to provide means whereon a commutator binding means may bear, assembling said plurality of bars in cylindrical formation, and applying a commutator binding means.

In testimony whereof I hereunto set my hand this 19th day of Sept., 1924.

VINCENT G. APPLE.